Nov. 21, 1961     G. AUGUSTIN     3,009,722
SEALING AND RETAINING RING
Filed Jan. 24, 1958
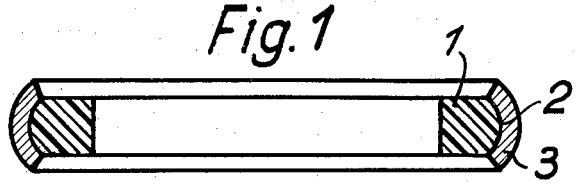
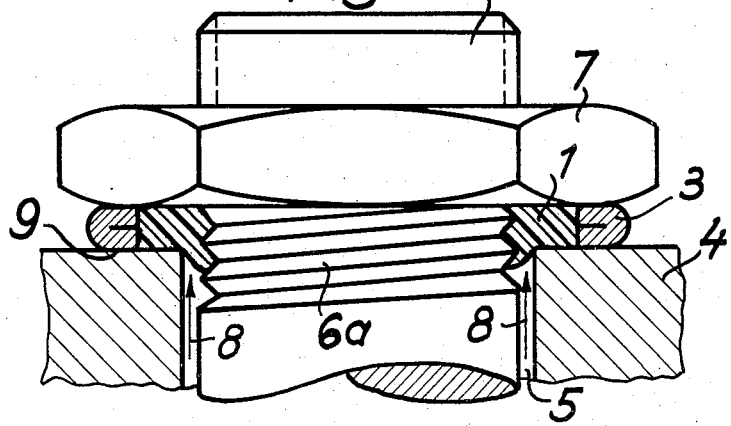
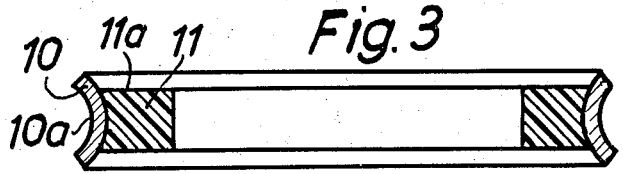
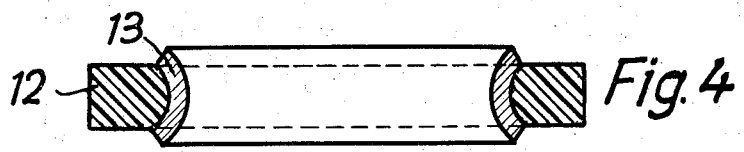
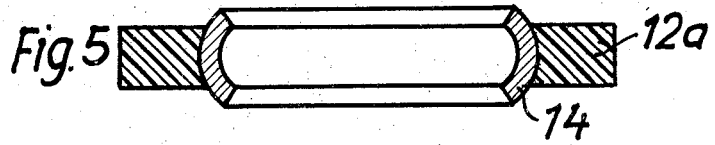
Gustav AUGUSTIN
INVENTOR
BY: Toulmin + Toulmin
ATTORNEYS

United States Patent Office 3,009,722
Patented Nov. 21, 1961

3,009,722
SEALING AND RETAINING RING
Gustav Augustin, Heilbronn, Germany, assignor to Kupfer-Asbest-Co., Gustav Bach, Heilbronn (Neckar), Germany
Filed Jan. 24, 1958, Ser. No. 711,068
Claims priority, application Germany Jan. 29, 1957
3 Claims. (Cl. 288—22)

The present invention relates to sealing and retaining means. More in particular, the present invention is concerned with a novel sealing and retaining ring, and more particularly still, with a sealing and retaining ring of the type comprising an annular disk of plastic, resilient material.

It is known in the art to construct sealing and retaining rings consisting of an annular disk of resilient, pliable material. The sealing and retaining effect is accomplished by virtue of the moldability of the annular ring, as the latter is pressed into the threadings of the screw and nut means to be sealed. Because of its own tension a surface friction is produced on the faces of the annular ring which is great enough to prevent any torsion. It has also been suggested to provide an annular ring as a sealing and retaining means having a cross-section of varying diameters, for example, having a thick portion at its inner and outer circumference and a thin portion between the latter two.

These known sealing and retaining rings have proved to be unsatisfactory. It has been discovered that the known annular rings are incapable of producing a secure retaining and tight sealing effect whenever the nut or screw to be sealed and secured are tightly fastened to each other. If this is done, a certain portion of the plastic material of the annular ring is inevitably pressed in a centrifugal direction until the axial pressure subsides which is excited by the screw or nut while being tightly fastened. This undesirable effect occurs also with annular rings having a thickened portion at their outer periphery. Consequently, a permanent, force-locking coupling between the two screwed-together elements (e.g. the screw and nut) cannot be achieved by the afore-described known sealing and retaining rings.

It has also been proposed to construct annular sealing means of the type not securing the screwed-together elements against torsional relative display, consisting of a hollow ring of sheet metal having a circular opening at its inner or outer periphery adapted to receive a plastic filler. As axial pressure reduces the hollow space within the annular metal ring, the plastic filler provided therein expands in a radial direction.

Although purporting to avoid the afore-mentioned disadvantages, this type of annular ring entails another, serious drawback.

The upper and lower faces, respectively, of these annular rings, consist of metal. The upper and lower surface, respectively, of such a sealing and retaining ring contacts the metal surface of the elements joined together and hence metal contacts metal. Experience has shown, however, that a mutual contact between metal surfaces does not lend itself to a secure retaining and tight sealing effect. This is primarily due to the milling furrows and grooves in the surface of the joined metal parts. The metallic surface of the sealing ring merely bridges these grooves and furrows in the metal surface of, for instance, the nut, but does not fill them up. It is quite obvious that a proper sealing is thus impossible, at least in the presence of high pressure.

It is an object of the present invention to provide a sealing and retaining ring which offers a perfect sealing under the influence and in the presence of high pressures.

It is another object of the present invention to provide a sealing and retaining ring which makes possible to achieve simultaneously a permanent, force-locking coupling between the portions to be sealed and a perfect sealing effect even in the presence of high pressures.

It is a further object of the present invention to provide a sealing and retaining ring which provides a perfect sealing of portions having metal surfaces with milling grooves and furrows.

These objects are achieved by the sealing and retaining ring of the present invention comprising an annular disk of plastic moldable and resilient material and a fitting ring mounted on the outer periphery of the annular disk. While the fitting ring is flexible and yielding in axial direction, it is radially rigid and thereby prevents the annular disk from being deformed in a radially extending plane in a direction away from the location to be sealed by the sealing ring. In the opposite radially extending direction the annular disk can be deformed and thereafter the fitting ring is rigid in an axial direction.

The fitting ring preferably has a bulged cross section, and the annular disk may have a roof-shaped slope or a slightly bulged configuration at its outer periphery contacting the fitting ring. Preferably, the edges of the fitting ring slightly protrude from the upper and the lower face, respectively, of the annular disk, as long as the fitting ring is substantially uninfluenced by pressure from the parts to be sealed against each other, as for example, a screw and a nut.

The invention will be more fully appreciated upon the following detailed description of the accompanying drawings, wherein:

FIGURE 1 is a cross-sectional view of the sealing and retaining ring of the present invention;

FIGURE 2 is a side view, partly in section, of tightly joined screw and nut means with the built-in sealing and retaining ring of the present invention;

FIGURE 3 is a cross-sectional view of another embodiment of the sealing and retaining ring of the present invention;

FIGURE 4 is a cross-sectional view of still another embodiment of the sealing and retaining ring of the present invention, particularly for use with internal threadings;

FIGURE 5 is a cross-sectional view of a further embodiment of the sealing and retaining ring of the present invention, particularly for use with internal threadings.

Referring now to the drawings somewhat more in detail and turning first to FIGURE 1, the annular disk 1 of resilient plastic material has a rectangular or square cross section. At its outer peripheral surface 2 the disk 1 has a substantially arcuate or curved configuration. A fitting ring 3 consisting of a material, having great tensile strength in particular, e.g., metal, encloses the annular disk in such a manner, that it slightly protrudes beyond the radial surfaces of the annular disk 1 and retains the same in position. The fitting ring 3 is slightly outwardly bulged.

FIGURE 2 illustrates the sealing and retaining means of FIGURE 1 in mounted position. In the portion 4 of a machine or machine element there is provided a boring 5 through which a screw bolt 6 is passed. The hexagon nut 7 is fastened thereupon, i.e., the two parts are screwed together. Between the machine portion 4 and the nut there is mounted the sealing and retaining means which has been deformed by tightening the nut 7. The annular disk 1 is restrained by the fitting ring 3 and is thus prevented from partially expanding to the outside under the influence of the force exerted by the tightly screwed nut 7.

At the same time, the fitting ring 3 is folded together and thereby presses the annular disk 1 towards the threading of the screw bolt and the nut. Consequently, certain portions of the annular disk 1 are pressed deeply into the threading and to some extent even into the boring 5. A medium, for example, liquid or gas, operating under pressure in the direction of arrow 8, therefore cannot escape through the sealed portions; in particular, it is prevented from escaping along the threading 6a of screw bolt 6. The sealing effect is further improved due to the fact that radial surface of the annular disk also snugly contacts and seals the surface 9 of the machine portion 4, as a portion of the lower surface of the annular disk 1 penetrates into the milling grooves and furrows of the nut and the machine surface. At the same time, a great protection against torsion is obtained due to the elasticity of the annular disk which produces tensions between the nut and the machine part. The fitting ring 3 is completely folded and consequently ensures a perfect force-locking, rigid connection of the coupled machine elements.

The fitting ring can also be bulged inwardly and the annular disk can have a corresponding concave configuration at its outer periphery contacting the fitting ring. This is shown in FIGURE 3, in which the fitting ring 10 is inwardly bulged and the annular disk 11 has a concavely shaped outer periphery 11a adapted to the inwardly bulged fitting ring. This fitting ring 10 folds in a direction opposite to the direction in which the fitting ring 3 of FIGURE 2 folds when subjected to pressure; in other words, the fitting ring 10 folds in such a manner that the upper and lower portion of its surface 10a are brought into mutual contact.

The basic features of the present invention are also adaptable to be used for sealing and retaining means for machine elements having an internal threading. This is illustrated in FIGURES 4 and 5 showing a concavely and a convexly shaped fitting ring 13 and 14, respectively, and an annular disk 12 and 12a, respectively. The fitting ring 13 is folded just as the fitting ring 10, whereas the fitting ring 14 is folded as the fitting ring 3. In both instances portions of the annular disk 12 and 12a, respectively, are pressed in an outward direction so as to snugly enter into the internal threading and eventually the grooves and furrows of the coupled machine elements. The fitting ring used in the sealing means of the present invention is constructed so as to have comparatively thin walls of a suitable material, preferably metal.

The annular disk is made of a plastic, resilient, moldable material, such as for example, Hycar, Polysar, silicone.

The present invention offers considerable advantages. A perfect sealing effect is accomplished even in the presence of high pressures and even if the coupled machine elements are tightly fastened to each other and although they may have metallic surfaces which are not perfectly polished and have residual milling grooves.

The bulged configuration of the fitting ring ensures an easy folding of the same under the influence of but slight axial pressures. The fitting ring is completely folded up and thereby a perfect force-locking coupling between the respective machine elements is guaranteed. Since the fitting ring has outer edges slightly protruding from the annular disk while not influenced by pressure, i.e. as long as the sealing ring has not been inserted between the machine elements to be sealed, the annular ring is securely retained within the fitting ring.

The sealing ring of the present invention furthermore results in a very satisfactory protection against torsion of one of the machine elements relative to the other and a loosening of the elements, for example, a screw and a nut, is prevented.

It will be understood that this invention is susceptible to modification in order to adapt it to different useages and conditions, and, accordingly, it is desired to comprehend such modifications within this invention as may fall within the scope of the appended claims.

What I claim is:

1. A sealing and retaining ring for threaded connections and positionable between relatively movable surfaces forming a connection, said sealing and retaining ring comprising in ready-assembled form a resilient annulus made from plastic material with the opposed radial faces thereof being substantially parallel, one of the inner and outer peripheral surfaces of said annulus having an arcuate cross section, a metallic fitting ring mounted on said one arcuate peripheral surface of said annulus and conforming to the curvature thereof, said fitting ring being substantially inextensible in a radial direction but being deformable in an axial direction so that the edges of the fitting ring are movable toward each other when the sealing ring is compressed between the movable surfaces, said fitting ring being so shaped that continued deformation of the ring in the axial direction will move the edges of the ring into rigid and permanent contact with each other with none of the plastic material of the annulus being compressed between the edges of the bent ring whereby the other of said peripheral surfaces is urged by plastic deformation sealingly against the thread of the connection and the opposed radial faces of the annulus to closely contact the movable surfaces to form a seal therebetween, the compressed ring forming a rigid retaining ring to prevent radial deformation of said annulus.

2. A sealing and retaining ring as claimed in claim 1 with the edges of said fitting ring projecting slightly beyond the opposed radial faces of said annulus when no axial force has been exerted on said fitting ring.

3. A sealing and retaining ring as claimed in claim 1 with the arcuate cross section of one of said peripheral surfaces of said annulus being convex.

References Cited in the file of this patent

UNITED STATES PATENTS

| 2,119,647 | Mueller et al. | May 7, 1940 |
| 2,396,005 | Gross et al. | Mar. 5, 1946 |
| 2,765,834 | Poupitch | Oct. 9, 1956 |
| 2,852,291 | Hults | Sept. 16, 1958 |

FOREIGN PATENTS

| 10,104 | Great Britain | of 1889 |
| 12,041 | Great Britain | of 1904 |